(12) United States Patent
Chapman et al.

(10) Patent No.: US 12,174,841 B2
(45) Date of Patent: Dec. 24, 2024

(54) AUTOMATIC MEDIA ASSET SUGGESTIONS FOR PRESENTATIONS OF SELECTED USER MEDIA ITEMS

(71) Applicant: Apple Inc., Cupertino, CA (US)

(72) Inventors: Nathaniel B. Chapman, Seattle, WA (US); Patrick H. Kelly, San Francisco, CA (US); Eric Circlaeys, Los Gatos, CA (US); Kevin Bessiere, Cupertino, CA (US); Brian J. Rogosky, Pennington, NJ (US); Alfredo Ramos-Alvarez, Middlesex (GB); Bruno J. Conejo, New York, NY (US); Matthias Mauch, London (GB); Hao Yang, Dublin, CA (US); Bruno Di Giorgi, London (GB); Jeremy P. Bogle, San Francisco, CA (US); Zachary H. Smith, San Francisco, CA (US); Betim Deva, Mountain View, CA (US); Daniel Cartoon, Atlanta, GA (US); Neil C. Foley, Reigate (GB); Menelaos D. Kokolios, London (GB); Lewis Kaneshiro, Emerald Hills, CA (US); Jorge A. Herrera Soto, Palo Alto, CA (US); James E. Hewitt, Los Gatos, CA (US); Casey W. Baker, San Francisco, CA (US); Alexa Rockwell, Cupertino, CA (US); Alexis H. Durocher, San Francisco, CA (US); Trevor M. Slaton, San Bruno, CA (US); Cristina N. Smith, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 17/661,635

(22) Filed: May 2, 2022

(65) Prior Publication Data
US 2022/0382766 A1 Dec. 1, 2022

Related U.S. Application Data

(60) Provisional application No. 63/195,562, filed on Jun. 1, 2021.

(51) Int. Cl.
*G06F 16/48* (2019.01)
*G06F 16/2457* (2019.01)
(Continued)

(52) U.S. Cl.
CPC ........ *G06F 16/24578* (2019.01); *G06F 16/48* (2019.01); *G06N 5/02* (2013.01);
(Continued)

(58) Field of Classification Search
CPC .... G06F 16/24578; G06F 16/48; G06F 16/40; G06F 16/487; G06F 16/489; G06F 16/60;
(Continued)

(56) References Cited

U.S. PATENT DOCUMENTS 10,546,229 B2 * 1/2020 Manico ............... G06Q 10/101
10,891,013 B2 1/2021 Miura
(Continued)

*Primary Examiner* — Hanh B Thai
(74) *Attorney, Agent, or Firm* — Blank Rome LLP

(57) ABSTRACT

Techniques for suggesting media assets, the technique including: requesting a set of candidate media assets for a set of user media items based on a knowledge graph metadata network describing the set of user media items; receiving metadata for the set of candidate media assets; determining one or more sets of ranked media assets based on the received metadata; and outputting the determined one or more sets of ranked media assets.

16 Claims, 8 Drawing Sheets

(51) Int. Cl.
*G06N 5/02* (2023.01)
*G06F 16/40* (2019.01)
*G06F 16/483* (2019.01)
*G06F 16/487* (2019.01)
*G06F 16/50* (2019.01)
*G06F 16/60* (2019.01)
*G06F 16/70* (2019.01)

(52) U.S. Cl.
CPC ............ *G06F 16/40* (2019.01); *G06F 16/483* (2019.01); *G06F 16/487* (2019.01); *G06F 16/489* (2019.01); *G06F 16/50* (2019.01); *G06F 16/60* (2019.01); *G06F 16/70* (2019.01)

(58) Field of Classification Search
CPC ........ G06F 16/483; G06F 16/50; G06F 16/70; G06N 5/02
USPC .......................................................... 707/723
See application file for complete search history.

(56) References Cited

U.S. PATENT DOCUMENTS

| | | | | |
|---|---|---|---|---|
| 11,269,898 | B1* | 3/2022 | Salaka | G06N 20/20 |
| 11,277,657 | B2* | 3/2022 | Yelton | H04N 21/4316 |
| 2008/0065988 | A1* | 3/2008 | Gupta | G06F 16/68 |
| | | | | 707/999.007 |
| 2009/0164516 | A1* | 6/2009 | Svendsen | G06F 16/639 |
| 2010/0082653 | A1* | 4/2010 | Nair | G06F 16/48 |
| | | | | 707/759 |
| 2010/0198767 | A1* | 8/2010 | Farrelly | G06F 16/686 |
| | | | | 706/46 |
| 2011/0276567 | A1* | 11/2011 | Asikainen | G06F 16/68 |
| | | | | 707/E17.101 |
| 2013/0066844 | A1* | 3/2013 | Bowers | G06Q 30/0639 |
| | | | | 707/706 |
| 2013/0254184 | A1* | 9/2013 | Ellsworth | G06Q 30/02 |
| | | | | 707/E17.014 |
| 2014/0244631 | A1* | 8/2014 | Arthur | G06F 16/43 |
| | | | | 707/723 |
| 2016/0073166 | A1* | 3/2016 | Hu | H04N 5/765 |
| | | | | 725/20 |
| 2016/0080485 | A1* | 3/2016 | Hamedi | G06Q 50/01 |
| | | | | 709/204 |
| 2016/0092556 | A1* | 3/2016 | Cooper | G06F 16/632 |
| | | | | 707/748 |
| 2016/0292158 | A1* | 10/2016 | Todd | H04L 65/612 |
| 2017/0083519 | A1* | 3/2017 | Huang | G06F 16/51 |
| 2017/0083524 | A1* | 3/2017 | Huang | G06F 16/9538 |
| 2017/0193531 | A1* | 7/2017 | Fatourechi | G06Q 30/0201 |
| 2017/0357644 | A1 | 12/2017 | Circlaeys | |
| 2018/0039910 | A1* | 2/2018 | Hari Haran | G06F 16/24578 |
| 2018/0124444 | A1* | 5/2018 | van Zwol | H04N 21/8352 |
| 2018/0129659 | A1* | 5/2018 | Jehan | G06Q 30/02 |
| 2018/0150897 | A1* | 5/2018 | Wang | G06F 16/435 |
| 2018/0189226 | A1* | 7/2018 | Hofverberg | G06F 12/1408 |
| 2019/0258723 | A1* | 8/2019 | Taycher | G06F 16/24578 |
| 2019/0281350 | A1* | 9/2019 | Ward | H04N 21/435 |
| 2019/0325035 | A1* | 10/2019 | Sagui | G06F 16/4387 |
| 2019/0340252 | A1 | 11/2019 | Huyghe | |
| 2019/0361982 | A1* | 11/2019 | Jacobson | G06F 16/686 |
| 2019/0370282 | A1* | 12/2019 | Vergnaud | G06V 10/764 |
| 2020/0125921 | A1* | 4/2020 | Manico | G06N 5/022 |
| 2020/0372064 | A1 | 11/2020 | Circlaeys | |
| 2020/0394213 | A1* | 12/2020 | Li | G06V 20/41 |
| 2021/0112300 | A1* | 4/2021 | Yelton | H04N 21/4532 |
| 2021/0124747 | A1* | 4/2021 | Kizelshteyn | H04N 21/252 |
| 2021/0192078 | A1* | 6/2021 | Cosman | G06F 21/6254 |
| 2021/0264520 | A1* | 8/2021 | Cummings | G06Q 40/12 |
| 2021/0357374 | A1* | 11/2021 | VanLandeghem | G06N 3/08 |
| 2022/0092071 | A1* | 3/2022 | McIntosh | G06F 16/532 |
| 2022/0391447 | A1* | 12/2022 | Di Cairano-Gilfedder | |
| | | | | G06F 16/2237 |
| 2022/0394320 | A1* | 12/2022 | McIntosh | G06F 16/487 |
| 2022/0406033 | A1* | 12/2022 | McIntosh | G06V 10/776 |

* cited by examiner

USER A DIGITAL ASSET COLLECTION

AUTOMATIC MEDIA ASSET SUGGESTIONS FOR PRESENTATIONS OF SELECTED USER MEDIA ITEMS

CROSS-REFERENCE TO RELATED APPLICATIONS

This application claims priority to U.S. Provisional Application No. 63/195,562, filed Jun. 1, 2021 which is hereby incorporated by reference.

TECHNICAL FIELD

Embodiments described herein relate to automatic media asset suggestions. More particularly, embodiments described herein relate to organizing, describing, and/or retrieving media assets based on contextual analysis of user media items, such that the media assets may be presented to a user of a computing system in the form of suggestions for selection for playback to accompany a multimedia presentation of the set of user media items.

BACKGROUND

Modern consumer electronics have enabled users to create, store, and access considerable amounts of user media items. For example, a computing system (e.g., a smartphone, a stationary computer system, a portable computer system, a media player, a tablet computer system, a wearable computer system or device, etc.) can create, store, or have access to a collection of user media items (also referred to as a user media item collection) that includes hundreds or thousands of user media items (e.g., images, videos, music, etc.).

Managing a user media item collection can be a resource-intensive exercise for users. For example, retrieving multiple user media items representing an important moment or event in a user's life from a sizable user media item collection can require the user to sift through many irrelevant user media items. This process can be arduous and unpleasant for many users. A digital user media item management system can assist with managing a user media item collection. A user media item management system represents an intertwined system incorporating software, hardware, and/or other services in order to manage, store, ingest, organize, and retrieve user media items in the user media item collection.

In addition to the aforementioned difficulties that a user may face in managing a large user media item collection (e.g., locating and/or retrieving multiple user media items representing an important moment, event, person, location, theme, or topic in a user's life), users may also struggle to determine (or be unable to spend the time it would take to determine) which user media items would be meaningful to view (e.g., in the form of a multimedia presentation, such as a slideshow, also referred to herein as a "Memory") and/or share with third parties, e.g., other users of similar user media management systems and/or social contacts of the user. Users may also not want to spend the time it would take to determine suitable user media items sequences, clusters, layouts, themes, transition types and durations, etc., for constructing such a multimedia presentation of a user's media items. Further, users may struggle to determine a suitable media asset (e.g., one or more songs to be used as a "soundtrack") to associate with the playback of a set of user media items that is to be included in a multimedia presentation. Thus, there is a need for methods, apparatuses, computer readable media, and systems to provide users with more intelligent and automated audio media asset suggestions for multimedia presentations of a set of user media items, e.g., based on one or more features of the user media items in the set of user media items.

SUMMARY

Techniques for suggesting media assets are disclosed herein, including a method comprising: requesting a set of candidate media assets for a set of user media items based on a knowledge graph metadata network describing the set of user media items; receiving metadata for the set of candidate media assets; determining one or more sets of ranked media assets based on the received metadata; and outputting the determined one or more sets of ranked media assets.

According to aspects of the present disclosure, an electronic device is disclosed, comprising: a memory; and one or more processors operatively coupled to the memory, wherein the one or more processors are configured to execute instructions causing the one or more processors to: request a set of candidate media assets for a set of user media items based on a knowledge graph metadata network describing the set of user media items; receive metadata for the set of candidate media assets; determine one or more sets of ranked media assets based on the received metadata; and output the determined one or more sets of ranked media assets.

Another aspect relates to a non-volatile computer-readable medium storing instructions that, when executed, caused a processor to: request a set of candidate media assets for a set of user media items based on a knowledge graph metadata network describing the set of user media items; receive metadata for the set of candidate media assets; determine one or more sets of ranked media assets based on the received metadata; and output the determined one or more sets of ranked media assets.

Other features or advantages attributable to the embodiments described herein will be apparent from the accompanying drawings and from the detailed description that follows below.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

Figure 1:
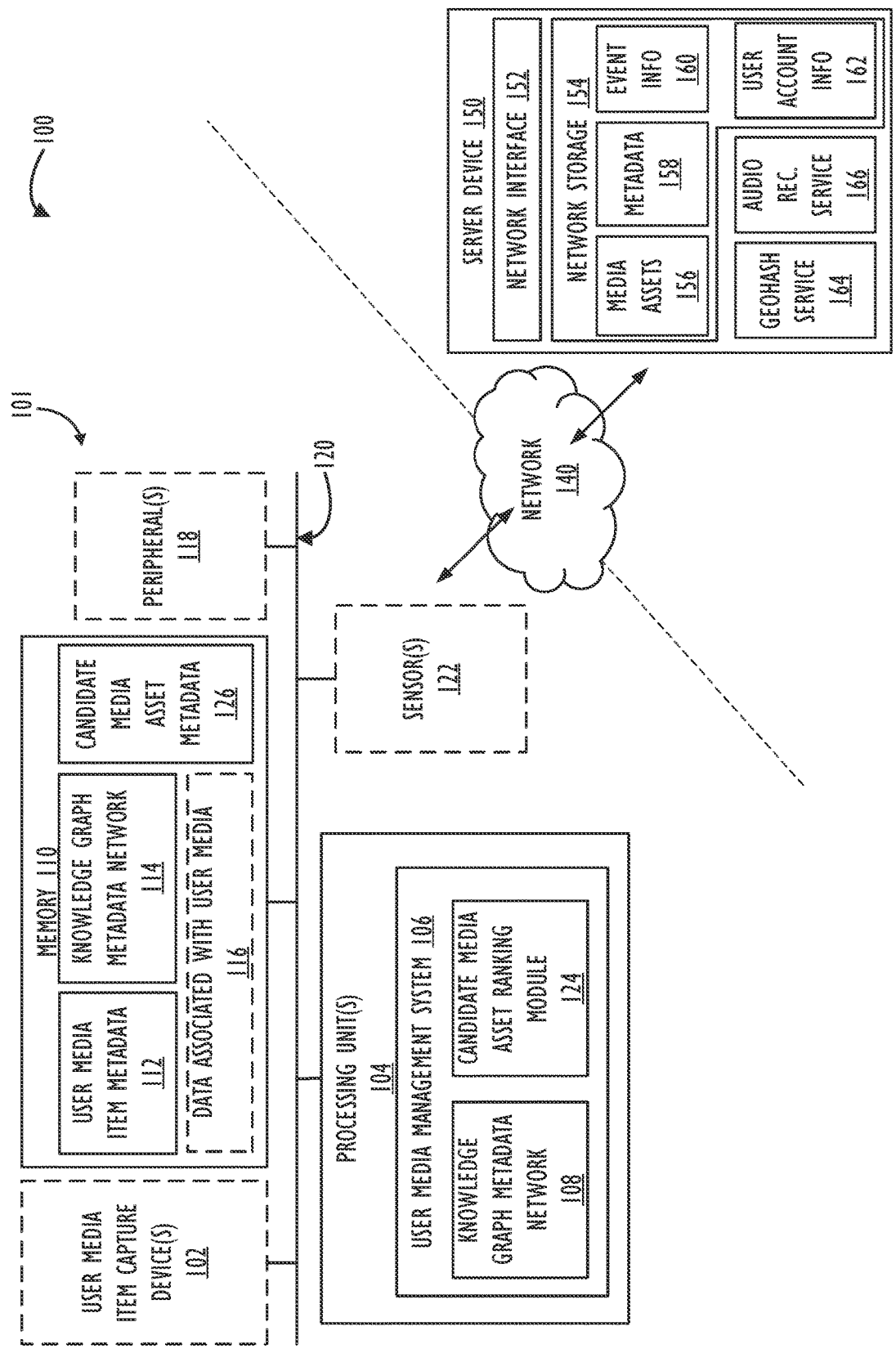
FIG. 1 illustrates, in block diagram form, an asset management processing system that includes electronic components for performing media item management, according to an embodiment.

FIG. 1 illustrates, in block diagram form, a media access system 100 that includes a client device 101 and a server device 150. The client device 101 includes electronic components for performing user media item management, in accordance with one or more embodiments described in this disclosure. The client device 101 can be housed in single computing system, such as a desktop computer system, a laptop computer system, a tablet computer system, a server computer system, a mobile phone, a media player, a personal digital assistant, a personal communicator, a gaming device, a network router or hub, a wireless access point (AP) or repeater, a set-top box, or a combination thereof. Components in the client device 101 can be spatially separated and implemented on separate computing systems that are connected by the communication technology 120, as described in further detail below.

For one embodiment, the client device 101 may include processing unit(s) 104, memory 110, a user media item capture device 102, sensor(s) 122, and peripheral(s) 118. For one embodiment, one or more components in the client device 101 may be implemented as one or more integrated circuits (ICs). For example, at least one of the processing unit(s) 104, the communication technology 120, the user media item capture device 102, the peripheral(s) 118, the sensor(s) 122, or the memory 110 can be implemented as a system-on-a-chip (SoC) IC, a three-dimensional (3D) IC, any other known IC, or any known IC combination. For another embodiment, two or more components in the client device 101 are implemented together as one or more ICs. For example, at least two of the processing unit(s) 104, the communication technology 120, the user media item capture device 102, the peripheral(s) 118, the sensor(s) 122, or the memory 110 are implemented together as an SoC IC. Each component of client device 101 is described below.

As shown in FIG. 1, the client device 101 can include processing unit(s) 104, such as CPUs, GPUs, other integrated circuits (ICs), memory, and/or other electronic circuitry. For one embodiment, the processing unit(s) 104 manipulate and/or process user media item metadata associated with user media items 112 or optional data 116 associated with user media items (e.g., data objects, such as nodes, reflecting one or more persons, places, points of interest, scenes, meanings, and/or events associated with a given user media item, etc.). The processing unit(s) 104 may include a user media item management system 106 for performing one or more embodiments of user media item management, as described herein. In some cases, the user media item management system 106 may include a candidate media asset ranking module 124 which ranks received candidate media asset metadata 126. For one embodiment, the user media item management system 106 is implemented as hardware (e.g., electronic circuitry associated with the processing unit(s) 104, circuitry, dedicated logic, etc.), software (e.g., one or more instructions associated with a computer program executed by the processing unit(s) 104, software run on a general-purpose computer system or a dedicated machine, etc.), or a combination thereof.

Figure 3:
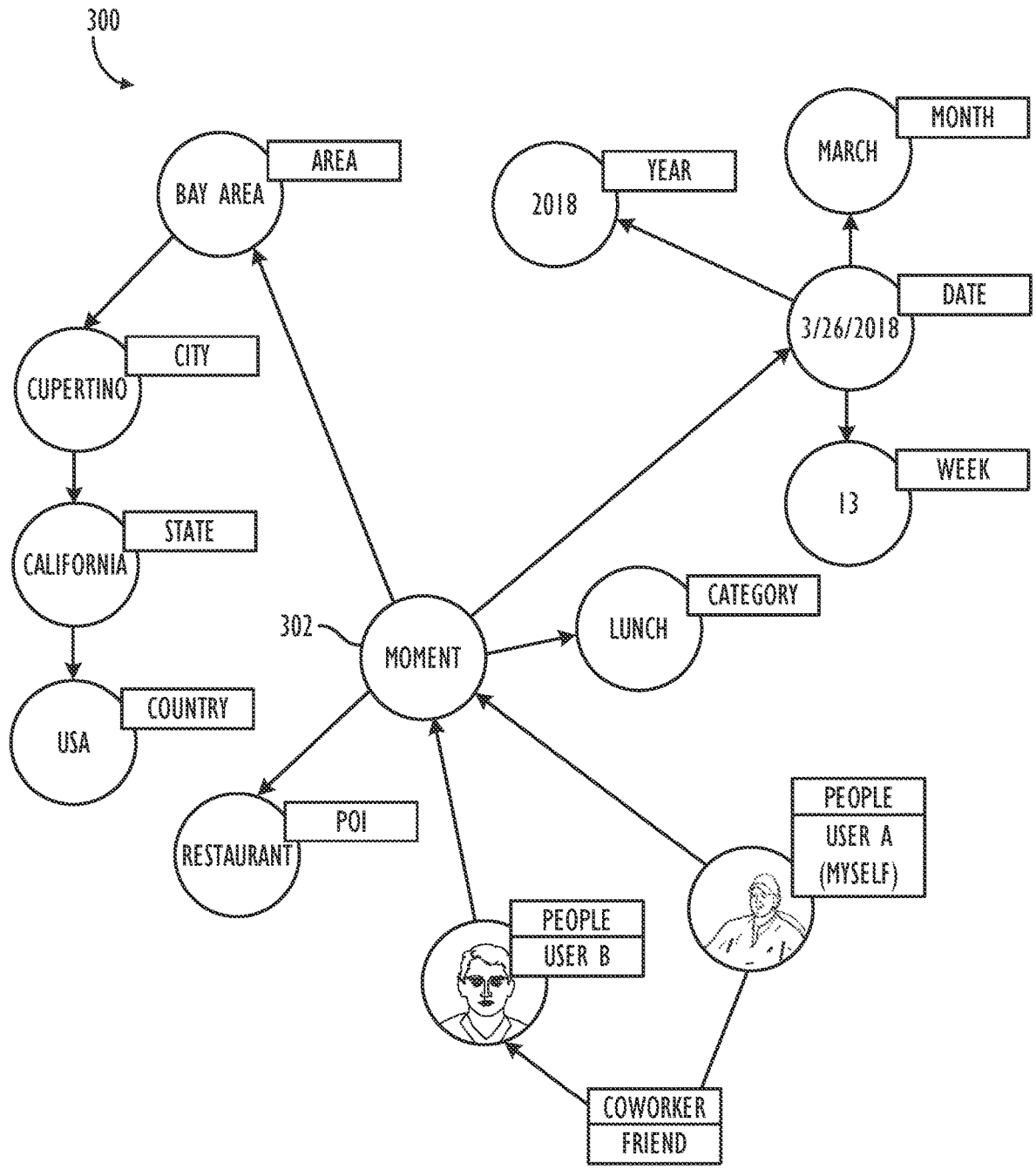
FIG. 3 illustrates, in block diagram form, an exemplary knowledge graph metadata network, in accordance with aspects of the present disclosure.

The user media item management system 106 can enable the client device 101 to generate and use a knowledge graph metadata network (also referred to herein more simply as "knowledge graph" or "metadata network") 114 of the user media metadata 112 as a multidimensional network. Metadata networks and multidimensional networks that may be used to implement the various techniques described herein are described in further detail in, e.g., U.S. Non-Provisional patent application Ser. No. 15/391,269, entitled "Notable Moments in a Collection of Digital Assets," filed Dec. 27, 2016 ("the '269 application"), which is incorporated by reference herein. FIG. 3 (which is described below) provides additional details about an exemplary metadata network 114.

In one embodiment, the user media item management system 106 can perform one or more of the following operations: (i) generate the metadata network 114; (ii) relate and/or present at least two user media items, e.g., as part of a moment, based on the metadata network 114; (iii) determine and/or present interesting user media in the user media collection to the user, based on the metadata network 114 and one or more other criterion; and (iv) determine and/or present a set of ranked media assets from a media asset server to the user, based on information from the metadata network 114 and contextual analysis. As an example, a metadata network may be generated based on user media items and, based on this metadata network, a presentation of a subset of the user media items may be automatically generated, and media assets may be automatically suggested to accompany the presentation.

The user media item management system 106 can obtain or receive a collection of user media item metadata 112 associated with a user media item collection. As used herein, "media items," and its variations refer to data that can be stored in or as a digital form (e.g., a digital file etc.). This digitalized data includes, but is not limited to, the following: image media (e.g., a still or animated image, etc.); audio media (e.g., a song, etc.); text media (e.g., an E-book, etc.); video media (e.g., a movie, etc.); and haptic media (e.g., vibrations or motions provided in connection with other media, etc.). The examples of digitalized data above can be combined to form multimedia (e.g., a computer animated cartoon, a video game, etc.). A single media item refers to a single instance of digitalized data (e.g., an image, a song, a movie, etc.). Multiple media items or a group of media items refers to multiple instances of digitalized data (e.g., multiple images, multiple songs, multiple movies, etc.). For this disclosure, the use of a media item refers to one or more media items including a single media items and a group of media items. For brevity, the concepts set forth in this document use an operative example of a media item as one or more images. It is to be appreciated that a media item is not so limited, and the concepts set forth in this document are applicable to other media items (e.g., the different media described above, etc.). Of note, user media item(s) include media items created a user, or user created media items acquired by the user. In contrast, media assets may refer to media items which may be (or have been) acquired by (or shared with) the user from a media store or other commercial entity.

As used herein, a "user media item collection," and its variations refer to multiple user media items that may be stored in one or more storage locations. The one or more storage locations may be spatially or logically separated as is known.

As used herein, "metadata," "user media item metadata," "user media item metadata," and their variations collectively refer to information about one or more user media items. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of user media items. Each type of metadata (also referred to as "metadata type") describes one or more characteristics or attributes associated with one or more user media items. Further detail regarding the various types of metadata that may be stored in a user media item collection and/or utilized in conjunction with a knowledge graph metadata network are described in further detail in, e.g., the '269 application, which was incorporated by reference above.

As used herein, "context" and its variations refer to any or all attributes of a user's device that includes or has access to the user media item collection associated with the user, such as physical, logical, social, and other contextual information. As used herein, "contextual information" and its variations refer to metadata that describes or defines a user's context or a context of a user's device that includes or has access to the user media item collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more user media items; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the user media item management system 106 uses the user media item metadata 112 to generate a metadata network 114. As shown in FIG. 1, all or some of the metadata network 114 can be stored in the processing unit(s) 104 and/or the memory 110. As used herein, a "knowledge graph," a "knowledge graph metadata network," a "metadata network," and their variations refer to a dynamically organized collection of metadata describing one or more user media items (e.g., one or more groups of user media items in a user media item collection, one or more user media items in the user media item collection, etc.) used by one or more computer systems. In a metadata network, there are no actual user media items stored—only metadata (e.g., metadata associated with one or more groups of user media items, metadata associated with one or more user media items, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, as alluded to above, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the conventional databases described above. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referenced information—they go beyond that and involve the extrapolation of data for inferring or determining additional data. As alluded to above, the user media items themselves may be stored, e.g., on one or more servers remote to the client device 101, with thumbnail versions of the user media items stored in system memory 110 and full versions of particular user media items only downloaded and/or stored to the client device 101's memory 110 as needed (e.g., when the user desires to view or share a particular user media item). In other embodiments, however, e.g., when the amount of onboard storage space and processing resources at the client device 101 is sufficiently large and/or the size of the user's user media item collection is sufficiently small, the user media items themselves may also be stored within memory 110, e.g., in a separate database, such as the aforementioned conventional databases.

The user media item management system 106 may generate the metadata network 114 as a multidimensional network of the user media item metadata 112. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the metadata network 114 includes two types of nodes—(i) moment nodes; and (ii) non-moments nodes. As used herein, "moment" shall refer to a contextual organizational schema used to group one or more user media items, e.g., for the purpose of displaying the group of user media items to a user, according to inferred or explicitly-defined relatedness between such user media items. For example, a moment may refer to a visit to coffee shop for lunch in Cupertino, California that took place on Mar. 26, 2018. In this example, the moment can be used to identify one or more user media items (e.g., one image, a group of images, a video, a group of videos, a song, a group of songs, etc.) associated with the visit to the coffee shop on Mar. 26, 2018 (and not with any other moment).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more user media items that is not a moment, e.g., a node associated with a particular person, location, multimedia presentation, etc. Further details regarding the possible types of "non-moment" nodes that may be found in an exemplary metadata network may be found e.g., the '269 application, which was incorporated by reference above.

For one embodiment, the edges in the metadata network 114 between nodes represent relationships or correlations between the nodes. For one embodiment, the user media item management system 106 updates the metadata network 114 as it obtains or receives new metadata 112 and/or determines new metadata 112 for the user media items in the user's user media item collection.

The user media item management system 106 can manage user media items associated with the user media item metadata 112 using the metadata network 114 in various ways. For a first example, user media item management system 106 may use the metadata network 114 to identify and present interesting groups of one or more user media items in the user media item collection based on the correlations (i.e., the edges in the metadata network 114) between the user media item metadata (i.e., the nodes in the metadata network 114) and one or more criterion. For this first example, the user media item management system 106 may select the interesting user media items based on moment nodes in the metadata network 114. In some embodiments, the user media item management system 106 may suggest one or more media assets, such as audio media, that may be used to accompany a presentation of the selected interesting user media items.

The client device 101 can also include memory 110 for storing and/or retrieving metadata 112, the metadata network 114, candidate media asset metadata 126, and/or optional data 116 described by or associated with the metadata 112. The metadata 112, the metadata network 114, and/or the optional data 116 can be generated, processed, and/or captured by the other components in the client device 101. For example, the metadata 112, the metadata network 114, and/or the optional data 116 may include data generated by, captured by, processed by, or associated with one or more peripherals 118, the user media item capture device 102, or the processing unit(s) 104, etc. The client device 101 can also include a memory controller (not shown), which includes at least one electronic circuit that manages data flowing to and/or from the memory 110. The memory controller can be a separate processing unit or integrated in processing unit(s) 104.

The client device 101 can include a user media item capture device 102 (e.g., an imaging device for capturing images, an audio device for capturing sounds, a multimedia device for capturing audio and video, any other known user media item capture device, etc.). Device 102 is illustrated with a dashed box to show that it is an optional component of the client device 101. For one embodiment, the user media item capture device 102 can also include a signal processing pipeline that is implemented as hardware, software, or a combination thereof. The signal processing pipeline can perform one or more operations on data received from one or more components in the device 102. The signal processing pipeline can also provide processed data to the memory 110, the peripheral(s) 118 (as discussed further below), and/or the processing unit(s) 104.

The client device 101 can also include peripheral(s) 118. For one embodiment, the peripheral(s) 118 can include at least one of the following: (i) one or more input devices that interact with or send data to one or more components in the client device 101 (e.g., mouse, keyboards, etc.); (ii) one or more output devices that provide output from one or more components in the client device 101 (e.g., monitors, printers, display devices, etc.); or (iii) one or more storage devices that store data in addition to the memory 110. Peripheral(s) 118 is illustrated with a dashed box to show that it is an optional component of the client device 101. The peripheral(s) 118 may also refer to a single component or device that can be used both as an input and output device (e.g., a touch screen, etc.). The client device 101 may include at least one peripheral control circuit (not shown) for the peripheral(s) 118. The peripheral control circuit can be a controller (e.g., a chip, an expansion card, or a stand-alone device, etc.) that interfaces with and is used to direct operation(s) performed by the peripheral(s) 118. The peripheral(s) controller can be a separate processing unit or integrated in processing unit(s) 104. The peripheral(s) 118 can also be referred to as input/output (I/O) devices 118 throughout this document.

The client device 101 can also include one or more sensors 122, which are illustrated with a dashed box to show that the sensor can be optional components of the client device 101. For one embodiment, the sensor(s) 122 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

For one embodiment, the client device 101 includes communication mechanism 120. The communication mechanism 120 can be, e.g., a bus, a network, or a switch. When the technology 120 is a bus, the technology 120 is a communication system that transfers data between components in client device 101, or between components in client device 101 and other components associated with other systems (not shown). As a bus, the technology 120 includes all related hardware components (wire, optical fiber, etc.) and/or software, including communication protocols. For one embodiment, the technology 120 can include an internal bus and/or an external bus. Moreover, the technology 120 can include a control bus, an address bus, and/or a data bus for communications associated with the client device 101. For one embodiment, the technology 120 can be a network or a switch. As a network, the technology 120 may be any network such as a local area network (LAN), a wide area network (WAN) such as the Internet, a fiber network, a storage network, or a combination thereof, wired or wireless. When the technology 120 is a network, the components in the client device 101 do not have to be physically co-located. Separate components in client device 101 may be linked directly over a network even though these components may not be physically located next to each other. For example, two or more of the processing unit(s) 104, the communication technology 120, the memory 110, the peripheral(s) 118, the sensor(s) 122, and the user media item capture device 102 are in distinct physical locations from each other and are communicatively coupled via the communication technology 120, which is a network device or a switch that directly links these components over a network 140.

In some cases, the client device 101 may be communicatively coupled via the network 140 to the server device 150. The server device 150 may include electronic components for performing managing and providing media assets to the one or more client devices. The server device 150 can be housed in single computing system, such as a computer server, virtual machine, virtual container, etc. or may be housed within multiple computing systems, such as a computer server system, multiple virtual machines, virtual containers, etc. In some cases, various components of the server device 150 may be spatially or logically separated and implemented on separate computing systems that are networked together via an internal network, such as a LAN, WAN, etc. The server device 150 includes one or more network interfaces 152 for communicating with client devices via network 140, and potentially with other server devices 150, if so configured.

In some cases, the server device 150 may function as a media asset repository and access network storage 154. The network storage 154 stores media assets 156 and metadata 158 associated with the media assets 156. In some cases, the network storage 152 may also include information related to events 160 that may be occurring at some locations and times. For example, the information related to events may include a schedule of sports events and where they are being played, concert locations and times, etc. The network storage 152 may also include user account information 162, which may include information related to users which have access to the media assets 156, such as account information, amount of access of the user, what media assets 156 the user has accessed, etc.

The server device 150, in some cases, may have or may be able to access various services, such as a geohashing service 164 and an audio recognition service 166. The geohashing service 164 may be configured to translate received geohashes to latitude/longitude location information. The audio recognition service 166 may be able to determine what media asset is being played based on a snippet of audio from the media asset.

Figure 2:
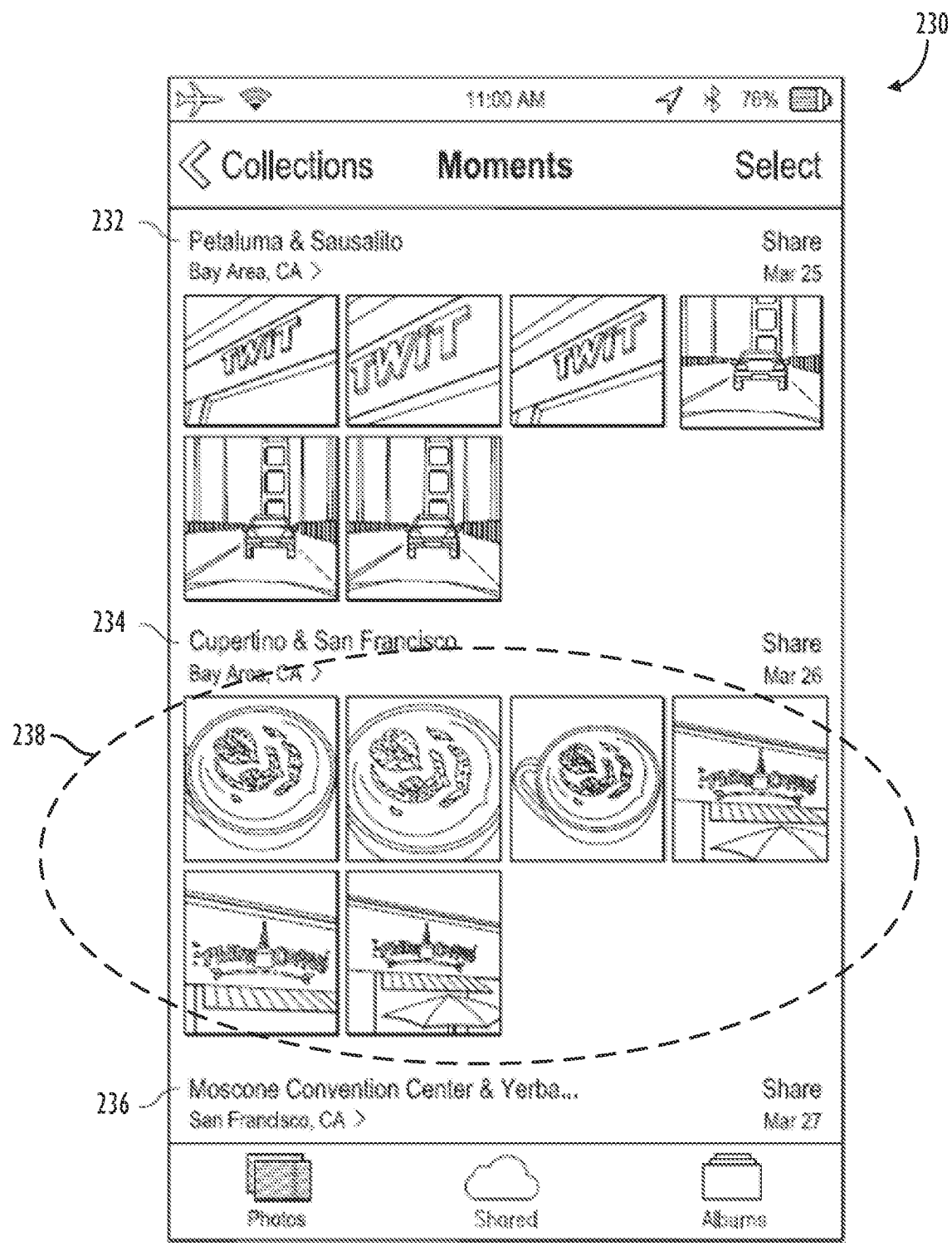
FIG. 2 illustrates an example of a moment-view user interface for presenting a collection of user media items, based on the moment during which the user media items were captured, according to an embodiment

FIG. 2 illustrates an example of a Moment-view user interface 230 for presenting a collection of user media items, based on the moment during which the user media items were captured, according to an embodiment. The interface 230 includes a list view of user media item collections, in this case, image collections 232, 234, and 236. Each such image collection may represent a unique moment in the user's user media item collection. The image collections 232, 234, 236 include thumbnail versions of images presented with a description of the location where the images were captured and a date (or date range) during which the images were captured. The definitions and boundaries between moments can be improved using temporal data and location data to define moments more precisely and to partition moment collections into more specific moments, as is described in more detail, e.g., in U.S. Non-provisional patent application Ser. No. 14/733,663, entitled "Using Locations to Define Moments," filed Jun. 8, 2015 ("the '663 application"), which is herein incorporated by reference.

FIG. 3 illustrates, in block diagram form, an exemplary knowledge graph metadata network 300, in accordance with aspects of the present disclosure. The exemplary metadata network illustrated in FIG. 3 can be generated and/or used by the user media item management system illustrated in FIG. 1. For one embodiment, the metadata network 300 illustrated in FIG. 3 is similar to or the same as the metadata network 114 described above in connection with FIG. 1. It is to be appreciated that the metadata network 300 described and shown in FIG. 3 is exemplary, and that not every type of node or edge that can be generated by the user media item management system 106 is shown.

In the metadata network 300 illustrated in FIG. 3, nodes representing metadata are illustrated as circles, and edges representing correlations between the metadata are illustrated as connections or edges between the circles. Furthermore, certain nodes are labeled with the type of metadata they represent (e.g., area, city, state, country, year, day, week month, point of interest (POI), area of interest (AOI), region of interest (ROI), people, Moment type, Moment name, performer, venue, business name, business category, etc.). In the example metadata network 300 illustrated in FIG. 3, an "Moment" node 302 is shown as linking together the various other metadata nodes.

For one embodiment, the metadata represented in the nodes of metadata network 300 may include, but is not limited to: other metadata, such as the user's relationships with other others (e.g., family members, friends, co-workers, etc.), the user's workplaces (e.g., past workplaces, present workplaces, etc.), the user's interests (e.g., hobbies, user media items owned, user media items consumed, user media items used, etc.), places visited by the user (e.g., previous places visited by the user, places that will be visited by the user, etc.). Such metadata information can be used alone (or in conjunction with other data) to determine or infer at least one of the following: (i) vacations or trips taken by the user; days of the week (e.g., weekends, holidays, etc.); locations associated with the user; the user's social group; the types of places visited by the user (e.g., restaurants, coffee shops, etc.); categories of events (e.g., cuisine, exercise, travel, etc.); etc. The preceding examples are meant to be illustrative and not restrictive of the types of metadata information that may be captured in metadata network 300.

One or more Moments may be organized and presented as a Memory, e.g., in the form of a multimedia presentation. In some implementations, a Memory may only include a presentation of user media items associated with a single Moment. In other implementations, however, a Memory may, e.g., include user media items associated with two or more related Moments. In still other embodiments, e.g., where a user may have groups of user media items involving assets related to each other for reasons other than having similar capture times and capture locations, a Memory may instead include all user media items related a particular situation, activity, topic, types of scene, person, pet, etc., at one or more locations over some arbitrary time interval, i.e., regardless of how many distinct Moments such user media items may be associated with. As an example, certain pictures and videos from a trip to the beach taken by the user may be selected for inclusion in a Memory. As another example, a Memory presentation may be based on a person and include user media items in which the person appears in. User media items from the one or more Moments are arranged into a multimedia presentation that may be displayed (e.g., played back) to the user, shared to other users, etc. In some cases, user media items included in a Memory may be arranged in a slideshow type presentation with transitions played between displays of clusters of one or more user media items. User media items presented in a Memory may be displayed/played back/arranged on backgrounds, and captions may be added. In some cases, accompaniments, such as the backgrounds, transitions, captions, suggested color treatments, and so forth may be suggested to the user prior to presenting or playing back the Memory for the first time.

Figure 4:
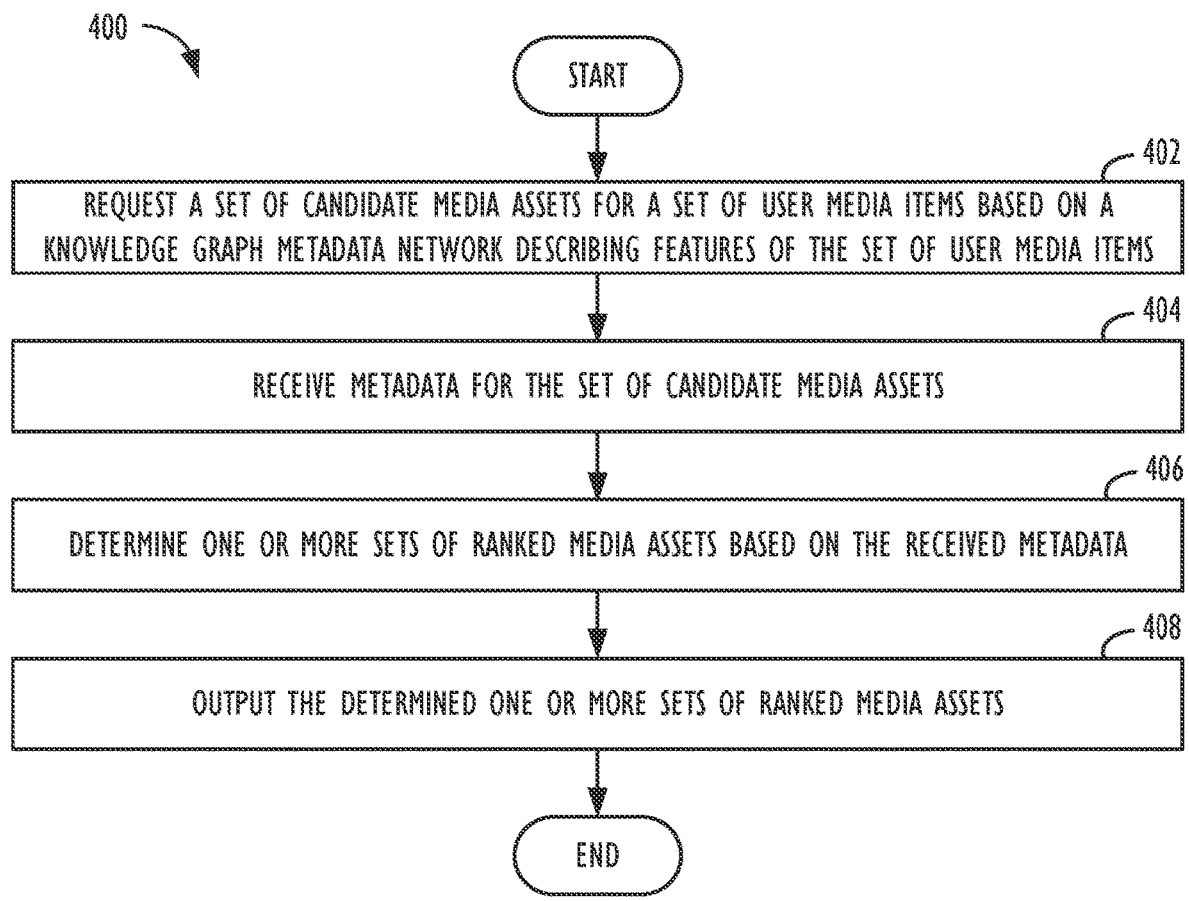
FIG. 4 is a flowchart illustrating a technique for suggesting media assets for Memory playback, in accordance with aspects of the present disclosure.

In accordance with aspects of the present disclosure, media assets may be suggested to the user to accompany the presentation of the Memory. For example, one or more music tracks from a media asset repository may be suggested to the user to score the playback of a Memory. FIG. 4 is a flowchart 400 illustrating a technique for suggesting media assets for Memory playback, in accordance with aspects of the present disclosure. It may be understood that the concepts embodied in flowchart 400 may be performed by any of a client or server device. Performing the steps included in flowchart 400 on a client device helps preserve privacy as less information can be transmitted to the server device.

At block 402, a set of candidate media assets are requested for a set of user media items based on a knowledge graph metadata network describing features of the set of user media items. In some cases, a client device may request metadata for candidate media assets based on the user media items identified for a Memory. The client device may place the request to one or more media asset repositories. In some cases, the media asset repository may include multiple media asset repositories and multiple sets of metadata candidate media assets may be requested from the multiple media asset repositories.

In some cases, a user associated with the client device may access the media asset repository using a user account of the user, allowing the user to access (e.g., playback) media assets. The media asset repository may be configured to store a listing of media assets that have been accessed by the user. For example, an online media service, such as an online video or music service, may store of list of music or videos previously watched or listened to by the user. In some cases, this list of media assets may be prefiltered, for example, to remove media assets which were not enjoyed by the user (e.g., thumbed down), or likely not associated with the user (e.g., an instance of a children's song being repeated fifty times in a single day). In some cases, the client device may request metadata for the media assets suggested for the user by the media asset repository for the candidate media assets. In some cases, additional sets of candidate media assets may also be requested, as detailed below. For example, the client device may request candidate media assets based on one or more categories of candidate media assets. The categories may be based on information contained in the metadata network associated with the user media items (e.g., particular scenes, objects, locations, dates, themes, or topics identified as being related to or present in the user media items). In some cases, the client device may request candidate media assets based on multiple categories of candidate media assets and obtain many more candidate media assets than may be used for a single Memory. For example, candidate media assets may be requested for multiple Memories, possible Memories, for a superset of categories, etc. As a more specific example, the client device may request candidate media assets associated with categories that could be used for possible Memories. In some cases, the client device may request candidate media assets associated with all possible categories applicable for user media items accessible by the client device. The received candidate media assets may be stored, by the client device, for use with later created Memories.

At block 404, metadata for the set of candidate media assets are received. For example, the one or more media asset repositories may respond and transmit requested metadata for the candidate media assets. In some cases, the client device may receive the set of candidate media assets from one or more media asset repositories and process the candidate media assets to a set of recommended media assets. The client device may receive many more candidate media assets than the client device will display to the user.

At block 406, one or more sets of ranked media assets are determined based on the received metadata. For example, the client may receive metadata for hundreds of candidate media assets and then filter and/or rank the candidate media assets to select a substantially smaller set (e.g., <10) media assets to suggest to the user. In some cases, different categories of candidate media assets may be ranked using differing ranking techniques. At block 408, the determined one or more sets of ranked media assets are output. For example, selected set of media assets may be displayed for the user as suggested media assets to accompany the presentation of the user media items in the Memory.

Figure 5:
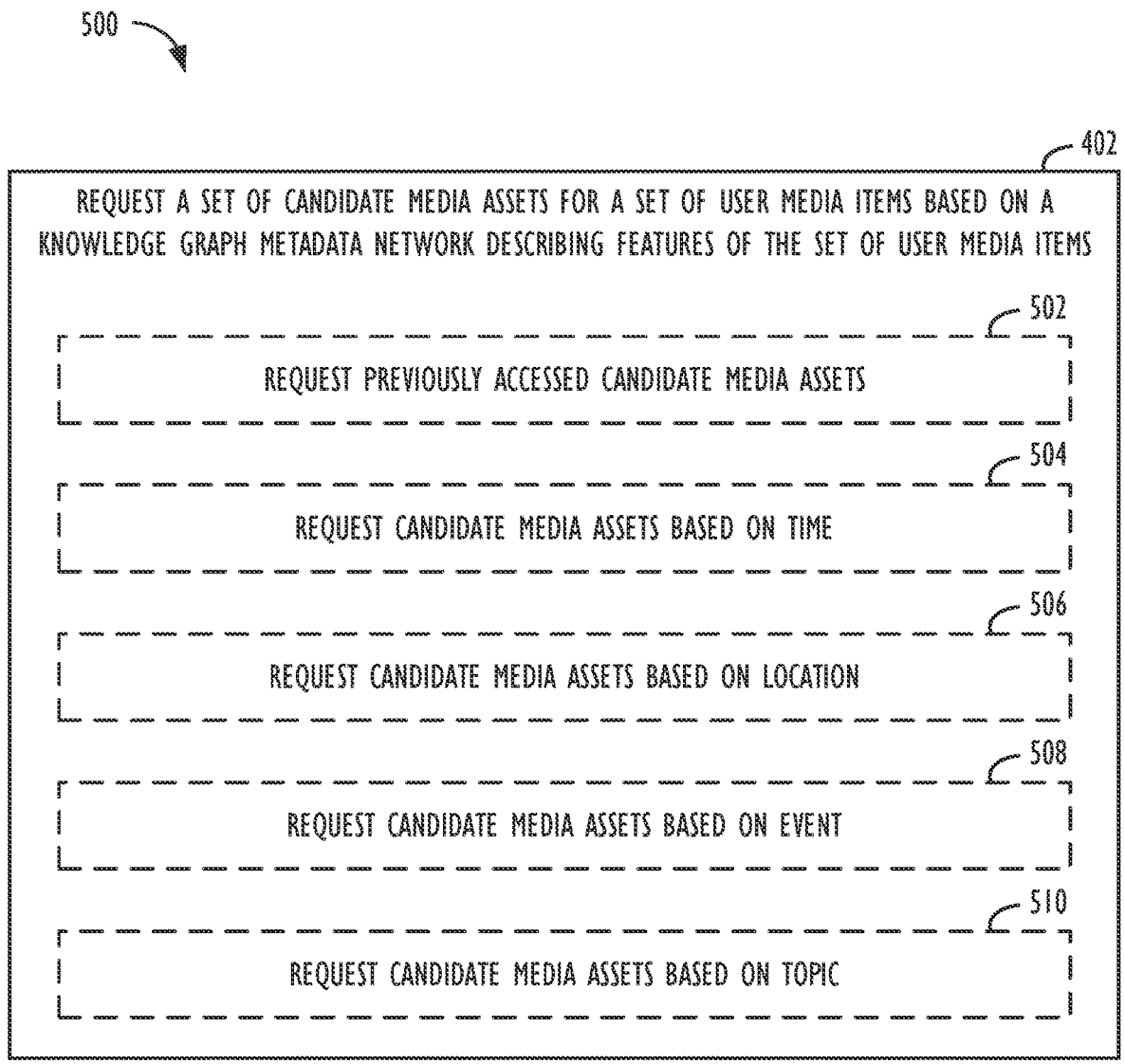
FIG. 5 is a block diagram illustrating optional aspects for requesting candidate media assets, in accordance with aspects of the present disclosure.

FIG. 5 is a block diagram 500 illustrating optional aspects for requesting candidate media assets, in accordance with aspects of the present disclosure. As shown, different categories of candidate media assets may be optionally requested for a set of user media items at block 402. In some cases, the client device may request the candidate media assets based on one, more than one, or all of the available categories. Optionally, at block 502, candidate media assets that were previously accessed by the user may be requested. In some cases, the media asset repository may store a listing of media assets accessed by the user and metadata related to the media assets previously accessed by the user may be requested. In some cases, the client device may have regularly access this list of previously accessed media assets. For example, the list and metadata related to the media assets on the list may be accessed and regularly updated via a media playback application, such as a media player application.

Optionally, at block 504, metadata related to candidate media assets may be requested based on time. In some cases, the time may be based on a time period associated with the user media items of the Memory. As an example, for a Memory including the moment shown in FIG. 3, metadata related to candidate media assets accessed by the user on or around the date associated with the Memory (i.e., Mar. 26, 2018), may be requested. In some cases, the metadata related to candidate media assets may include information related to how the media assets were accessed. For example, the metadata may include an indication of how many times a particular media asset was accessed and/or whether the media asset was skipped, thumbed down, etc.

In some cases, the time period associated with the user media items of the Memory may span a relatively long period of time. For example, a Memory may be based on a year and include user media items from that year. In such cases, rather than requesting metadata for candidate media assets specific to the time associated with specific user media items, metadata for candidate media assets may be requested over a time range. In some cases, the media asset repository may be configured to routinely determine lists of media assets accessed by the user over certain time periods and metadata associated with the media assets in these lists may be requested. For example, the media asset repository may generate a yearly 'in review' or 'top music for you of [year]' playlists based on media accessed by the user during the year. When a time period associated with a Memory aligns and/or encompasses a time period associated with such a generated list, the generated list may be requested and metadata associated with media items from the generated list obtained by the client device.

To help maintain privacy, metadata related to candidate media assets requested based on time may be oversampled. For example, to avoid the media asset repository being able to determine the dates on which the client device is creating memories for, the client device requests may request candidate media assets based on more time periods than the time period associated with the Memory. This may help obfuscate the time period associated with the Memory. As an example, for the Memory including the moment shown in FIG. 3, the client device may request metadata related to candidate media assets for multiple days in addition to the date associated with the Memory (i.e., Mar. 26, 2018). As another example, where the client device requests routinely determined lists of media assets accessed by the user over certain time period, the client device may request determined media assets accessed by the user over multiple time periods (e.g., 2016 in review, 2017 in review, 2018 in review, etc.). In some cases, the client device may request metadata related to candidate media assets for time periods consistent with all of the user media items available to the client device.

Optionally, at block 506, metadata related to candidate media assets may be requested based on a location. The location may be based on a location associated with the user media items of the Memory. In some cases, the client device may indicate a time and location and the media asset repository may provide metadata related to candidate media assets based on the indicated time and location. As an example, for a Memory including the moment shown in FIG. 3, the client device may request metadata related to candidate media assets associated with a time and location, in this example, March of 2018 in the Bay Area of California, and the media asset repository may return metadata related to candidate media assets that were popular at the requested time and location. In some cases, the server may first remove media assets that are widely popular over a larger area (e.g., internationally or globally popular) media assets from the returned candidate media assets for the requested time and location. This helps the returned candidate media assets for the requested time and location retain a local flavor. As an example, for a Memory of a trip to a foreign country, returned candidate media assets for the requested time and location may include media assets that were popular at the time of the trip in that foreign country. Media assets that are internationally popular at the time (or those popular in the country associated with the user) may be removed to help tie the Memory to the foreign country.

To help maintain privacy, time and location data may be oversampled. For example, to avoid the media asset repository being able to determine the time/location of the client device, the client device may request candidate media assets based on time periods when the client device is not a particular location. For example, the client device may request candidate media assets for the foreign country for a random number of days prior to and after the time period associated with the user media items of the Memory. In some cases, the location information sent to the media asset repository may be geohashed with reduced precision. For example, the latitude/longitude coordinate location information may be geohashed with a single digit of precision to identify an area of approximately 2,500 square kilometers. This reduced precision allows a general region a client device was located at to be identified, such as the Bay Area of California, but is not sufficiently precise to specifically locate the client device. Metadata for candidate media assets returned may be based on this reduced precision location information. For example, the media asset repository may return metadata for all media assets which were popular in the general region identified by the reduced precision location information.

Optionally, at block 508, metadata related candidate media assets may be requested based on one or more events. This event information may be based on the user media items of the Memory. In some cases, the client device may indicate a time and location and the media asset repository may determine one or more events that occurred at the provided time and location. The media asset repository may then provide metadata related to candidate media assets based on the one or more events that were occurring at the provided time and location. For example, a Memory, such as attending a concert, may include user media items associated with a date and location. The client device may request metadata related to candidate media assets associated with the time and location information and the media asset repository may provide information related to the events that occurred at the time and location. For example, metadata for candidate media assets related to the concert, such as music by artists performing at the concert, may be provided. In some cases, to help maintain privacy, as described above, the time may include one or more times, or may be a time range, and the location information may be a geohash. The media asset repository may then provide information related to all events occurring at the one or more times or during the time range, across a region.

In some cases, one or more media assets may be recognized in the user media items and these metadata related to media assets associated with the recognized one or more media assets may be provided. As an example, the Memory may include a user media item such as a video which includes a portion of a song in the background. The portion of the song may be analyzed by one or more online services to identify the song. The online services may be provided by the media asset repository in some cases. Metadata associated with media assets related to the identified song, and potentially including the identified song, may be provided to the client device.

Optionally, at block 510, metadata related candidate media assets may be requested based on one or more topics. The topic may be based on a topic associated with the user media items of the Memory. In some cases, one or more topics may be inferred from the user media items selected for presentation as a Memory. In some cases, these topics may be inferred based on the metadata network associated with the user media items. For example, as discussed above, the user's relationships with others, their interests, places visited, cities, regions, etc., may be represented in the metadata network, and based on these representations, vacations, trips, locations, types of places visited, category of events, etc. may be inferred. This represented and inferred information may be use separately or in a combined manner to determine one or more topics for the selected user media items. Returning to the example Memory including the moment shown in FIG. 3, the client device may determine, based on the metadata network, that a topic for the Memory is lunch with a friend. The client device may then request metadata for candidate media assets that may be used to accompany a Memory with a topic of lunch with a friend. In some cases, a set of topics may be predefined. In some cases, multiple topics may be identified for a set of user media items. For example, the client device may determine that user media items for a Memory may include a topic of a beach visit, and as the visit was during a holiday time, such as Thanksgiving, another topic of the Memory may be the Thanksgiving holiday. In some cases, candidate media assets may be requested based on the one or more determined topics. For example, the client device may transmit a request including an indication of the determined topics to the media asset repository.

In some cases, the media asset repository may include one or more media assets tagged with metadata corresponding to the determined one or more topics. For example, certain songs on the media asset repository may be identified and tagged as being suited to accompany user media items in a Memory with a topic of being on a beach, or for the Thanksgiving holiday. In some cases, the media assets may be identified and tagged as being suited to certain topics by human curators. In other cases, the media assets may be identified as being suited to certain topics based on machine learning techniques, and/or a combination of human curators and machine learning. In some cases, the media assets may be returned based in part on how well their metadata tags match the determined one or more topics. How well metadata tags match the determined one or more topics may be based on any suitable known techniques. For example, determining how well metadata tags match topics may including counting a number of matching tags and topics, or may include one or more machine learning models trained to associate tags and topics which may not exactly match. In some cases, certain tags may be considered more important than other tags. For example, where the topic includes certain holidays, media assets having a corresponding holiday tag may be considered better matching even if other tags of those media assets do not match the determined topic as well.

In some cases, media assets may be identified and tagged based in part on how suited the media asset is for accompanying user media items based on one or more factors. As an example, for musical media assets, these factors may include a length of a song, length of an intro, features of the song (e.g., energy, mood, etc.), and/or lyrical analysis. In some cases, portions of a media asset may be identified as being more suited than other portions of the media asset. For example, the chorus portion of a song may be identified as being well-suited, while an intro portion of the song may not be.

To help maintain privacy, the topics may be oversampled. For example, to avoid the media asset repository being able to determine the topic of a particular Memory being created by the client device, the client device may request candidate media assets associated with other topics in addition to the topics associated with the Memory being created.

Figure 6:
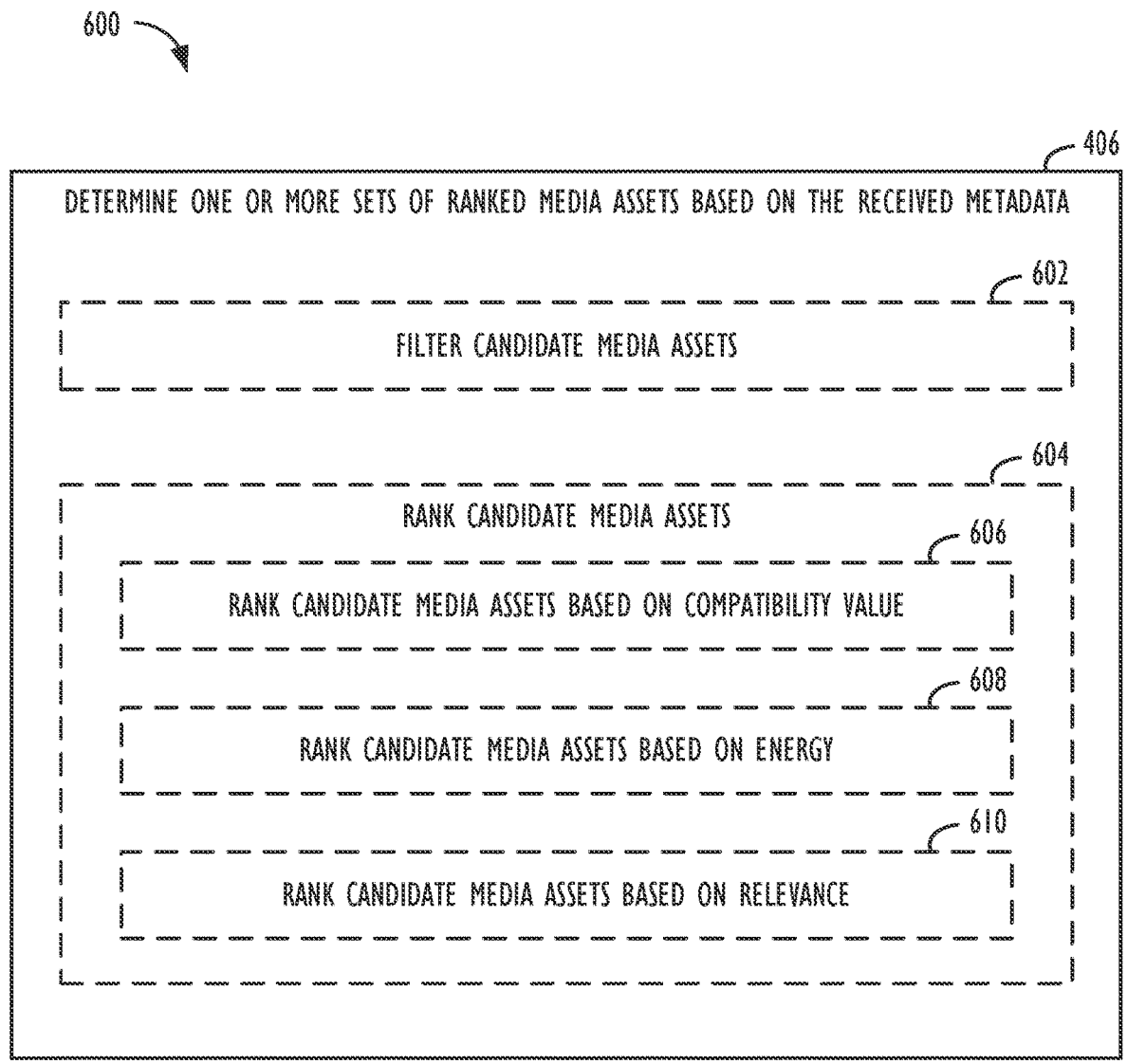
FIG. 6 is a block diagram illustrating optional aspects for determining one or more sets of ranked media assets, in accordance with aspects of the present disclosure.

As indicated above, the client device may request metadata for many more candidate media assets than are eventually presented to the user for selection. FIG. 6 is a block diagram 600 illustrating optional aspects for determining one or more sets of ranked media assets, in accordance with aspects of the present disclosure. After the metadata for the set of candidate media assets are received, at block 406, a determination of one or more sets of ranked media assets is made based on the received metadata. While the determination of the one or more sets of ranked media assets may be made by an online service, such as the media asset repository, to help maintain privacy, determination of the one or more sets of ranked media assets may be performed by the client device.

Optionally, at block 602, the set of candidate media assets may be filtered. In some cases, the set of candidate media assets may be filtered to remove some media assets. For example, the set of candidate media assets may be filtered to remove media assets containing explicit content, based on the length of a particular media asset, digital rights management concerns regarding the particular media asset, etc. In some cases, the filters may be user configurable. As discussed above, the requested candidate media assets may be oversampled. In some cases, filtering may be performed to remove oversampled candidate media assets returned from the media asset repository.

Optionally, at block 604, the set of candidate media assets may be ranked. Ranking may be used to help identify the most potentially relevant media assets of the set of candidate media assets so they can be presented to the user. Ranking may be performed based on one or more ranking factors. Optionally, at block 606, the candidate media assets may be ranked based on a compatibility value. In some cases, the metadata for media assets of the set of candidate media assets may include a compatibility value for each media asset indicating how compatible the media asset is to the user. As an example, a media asset repository may suggest to a user one or more media assets based on the media assets consumed by the user. As a more specific example, a music or video service may suggest other music or videos to a user based on what the user previously listened to or watched. This other music or videos may include content that the user previously consumed, or content that the user has not previously consumed. In some cases, to suggest media assets to the user, the media asset repository may determine, for the user, compatibility values for media assets of the media asset repository, which indicate, for example, how likely the media asset will appeal to the user. These compatibility values may be included in the metadata for the set of candidate media assets.

Optionally, at block 608, the candidate media assets may be ranked based on an energy of the candidate media assets. In some cases, the metadata for media assets of the set of candidate media assets may include an indication of an energy level of the media asset. The energy level of the media asset may be a measure of how fast a media asset feels based on features of the media asset. For example, an energy level of a song may be determined based on a measure of how melodic the song is, how acoustic the song is, a number of beats per minute, etc. Continuing the example, a song that is more melodic, has a higher acoustic score, and a lower beats per minute may be determined to be lower energy.

In some cases, an energy level may be inferred from the user media items selected for presentation as a Memory. This energy level may be inferred based on the metadata network associated with the user media items. As discussed above, the metadata network may include represented and inferred information regarding the user media items and this represented and inferred information may be use separately or in a combined manner to determine an energy level of the selected user media items. In some cases, this determined energy level may be based on the one or more topics or lyrical content of the selected user media items. Returning to the example Memory including the moment shown in FIG. 3, the client device may determine, based on the metadata network, that as the selected user media items relate to lunch with a friend, then the selected user media items may be associated with a lower energy level. Similarly, a set of selected user media items related to a snowboarding trip may be associated with a higher energy level.

Once an energy level associated with the selected user media items are determined, the media assets of the candidate media assets may be ranked based on how well the energy level of the media assets of the candidate media assets match the energy level associated with the selected user media items. How well the energy levels match may be determined based on any known technique. In some cases, matching a higher energy media asset with selected user media items associated with a lower energy may be a poor fit for users. Conversely, matching a lower energy media asset with selected user media items associated with a higher energy may work well in many cases. Thus, media assets having a relatively lower energy level as compared to the selected user media items may be preferred.

Optionally, at block 610, the candidate media assets may be ranked based on a relevance of the candidate media assets to the selected user media items. In some cases, the relevance of media assets may be based on one or more cultural factors. In some cases, the cultural factors may differ across a range of countries and regions. The cultural factors as for a user may be defined, for example, based on where the user typically resides. For example, if a user resides in Quebec, Canada, media assets which are in French may be ranked higher than media assets in other languages. Additional factors may be applied based on, for example, a determination that the user is visiting another country. For example, if the user media items selected for presentation as a Memory are for the user from Quebec and are associated with a location in the Bahamas, then candidate media assets which are suited for accompanying user media items with a topic of beach that are Canadian in origin may be ranked lower than candidate media assets which are suited for accompanying user media items with a topic of beach that are Bahaman in origin.

In some cases, the ranking of certain media assets may be adjusted, for example, based on whether the media assets have been previously output and/or selected by the user. For example, a media asset may be highly ranked by any one or more of the ranking techniques and previously output to the user as a suggested media asset. If this media asset has been previously output a number of times without being selected by the user, the ranking of this media asset may be adjusted to reduce the rank of the media asset. As another example, if another media asset has been previously suggested to the user and selected by the user for another Memory, then the rank of this media asset may be adjusted to reduce the rank of the media asset to help encourage the user to select a different media asset.

In some cases, how the candidate media assets are ranked may differ based on the category of candidate media asset requested. For example, candidate media assets which were requested based one or more topics associated with the user media items of the Memory may be ranked based on the compatibility value. In some cases, candidate media assets may also be ranked based on multiple ranking techniques. For example, candidate media assets which were requested based on being previously accessed by the user may be first ranked based on the energy of the candidate media asset. The candidate media assets may then be ranked again, for example for media assets with the same energy measure, or are within a range of energy measures, based on the compatibility value.

Sets of suggested media assets may be determined based on the output ranked media assets. The sets of suggested media assets may be displayed to the user for selection to accompany the user media items for the Memory. To help increase a diversity of suggested media assets output to the user for selection, multiple sets of suggested media assets may be output. In some cases, the multiple sets of suggested media assets may be based on one or more categories of candidate media assets requested.

Figure 7:
FIG. 7 illustrates an exemplary user interface for displaying suggested media assets, in accordance with aspects of the present disclosure.

FIG. 7 illustrates an exemplary user interface 700 for displaying suggested media assets, in accordance with aspects of the present disclosure. Any number of sets of suggested media assets may be included in the user interface 700. As shown, the user interface 700 includes three sets of suggested media assets. In case additional sets of suggested media assets are available in the user interface 700, these additional sets may be accessible, for example, by scrolling, swiping, etc.

In some cases, multiple categories of candidate media assets requested may be combined into a single set of suggested media assets. In this example, a first set of suggested media assets, here top picks 702, may include the highly ranked candidate media assets which were requested based on one or more topics associated with the user media items of the Memory as well as highly ranked candidate media assets which were previously accessed by the user. A first number of the most highly ranked candidate media assets which were requested based on topics and a second number of the most highly ranked candidate media assets which were previously accessed by the user may be included in the Top Picks 702. In some cases, where multiple categories of candidate media assets are combined, one category may be preferred as compared to another category. For example, the first number of candidate media assets which were requested based on topics may be displayed before the candidate media assets previously accessed by the user. In other cases, the categories may be interlaced or the candidate media assets of the set of suggested media assets may be ranked. In some cases, how the categories are combined may be based on the user media items. For example, if a topic associated with the user media items of the Memory is a particular holiday, one category of candidate media assets, such as the candidate media assets which were requested based on topics (e.g., the particular holiday) may be prioritized in the set of suggested media assets. In some cases, the user may access a full listing of the candidate media assets of the set of suggested media assets by accessing a UI element, here See All 704.

In this example, a second set of suggested media assets, Suggested for You 706, may include a single category of candidate media assets. Here, Suggested for You 706 includes highly ranked candidate media assets which were previously accessed by the user. Where media assets from a category of candidate media assets were included in another set of suggested media assets, those media assets may be not included in other sets of suggested media assets. For example, the Top Picks 702 set of selected media assets includes a second number of candidate media assets which were previously accessed by the user. The candidate media assets which were included in the Top Picks 702 set of selected media assets may not be included in the Suggested for You 706 set of selected media assets. Rather, the next most highly ranked candidate media assets may be included in the Suggested for You 706 set of selected media assets.

As another example, a third set of suggested media assets, From this time 708, may include highly ranked candidate media assets which were requested based on a time. Other sets of suggested media assets may be based on, for example, candidate media assets requested based on an event or candidate media assets requested based on a location. In some cases, the sets of suggested media assets may be user configurable.

In some cases, the sets of suggested media assets may vary based on aspects of the user media items of the Memory. For example, where a time period associated with the user media items of the Memory span a long period of time, candidate media assets requested based on time may be less useful as there may be far too many media assets from that period of time. In such cases, a set of suggested media assets based on the time period may be omitted.

In some cases, once the user selects a media asset to use to accompany the user media items of the Memory, the media asset may be retrieved from the media asset repository for playback. In other cases, an identifier associated with the selected media asset may be associated with the Memory, such that the selected media asset may be retrieved from the media asset repository by its identifier at a later point in time, e.g., the next time a user requests playback of the Memory. In some cases, users may also be presented with a user interface option to change or update the selected media asset for a given Memory over time, e.g., as the user's musical tastes change and/or the user (or the media management system) is able to identify and discover another audio media asset that the user may find more appropriate to serve as the soundtrack for the given Memory.

Figure 8:
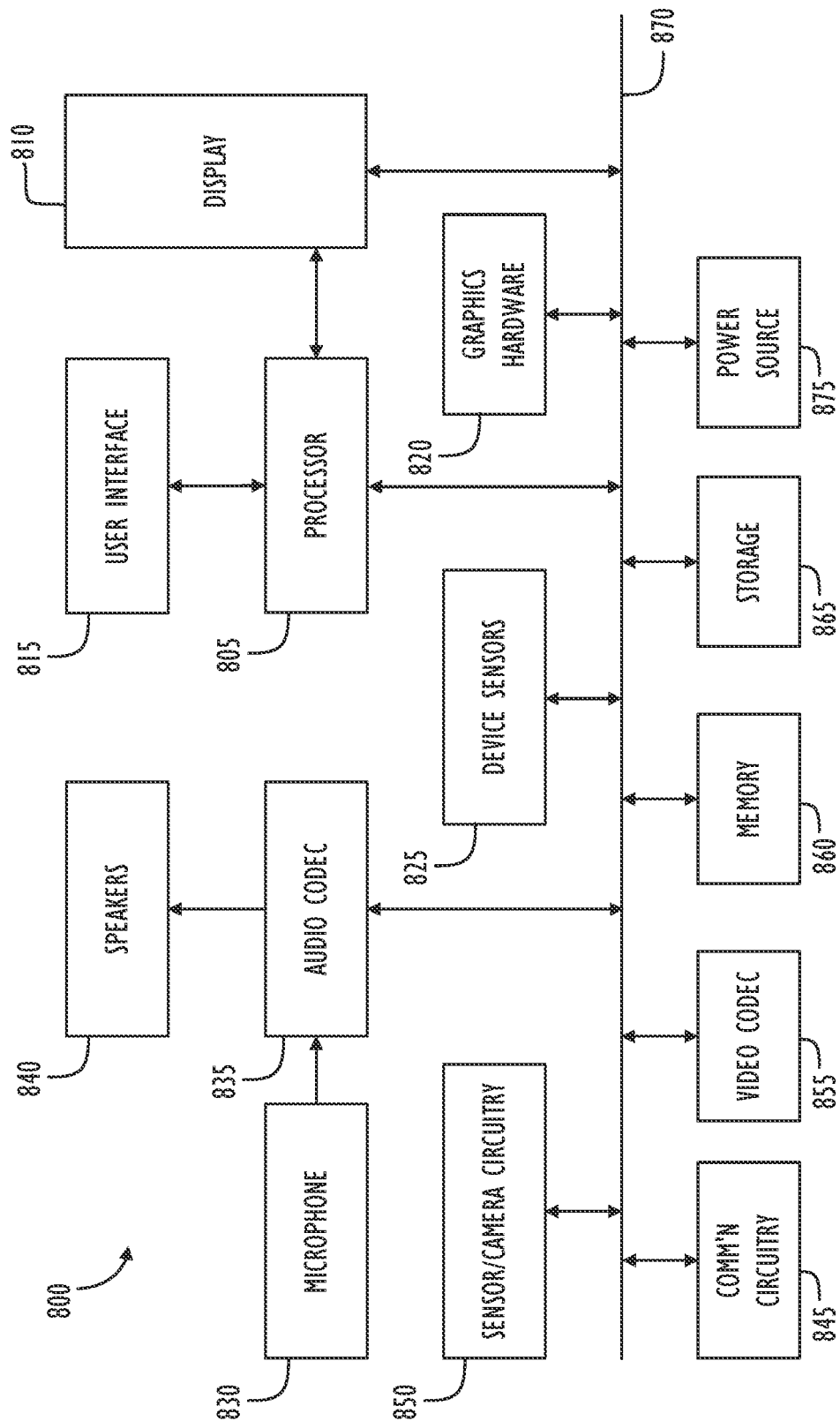
FIG. 8 is a simplified functional block diagram of an illustrative programmable electronic device for performing user media item management is shown, according to one embodiment.

Referring now to FIG. 8, a simplified functional block diagram of an illustrative programmable electronic device 800 for performing user media item management is shown, according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, which may, e.g., comprise multiple camera units/optical sensors having different characteristics (as well as camera units that are housed outside of, but in electronic communication with, device 800), video codec(s) 855, memory 860, storage 865, and communications bus 870.

Processor 805 may execute instructions necessary to carry out or control the operation of many functions performed by device 800 (e.g., such as the generation and/or processing of user media items in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 810 may display a video stream as it is captured while processor 805 and/or graphics hardware 820 and/or image capture circuitry contemporaneously store the video stream (or individual image frames from the video stream) in memory 860 and/or storage 865. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may comprise one or more camera units configured to capture images, e.g., images which may be managed by a user media item management system, e.g., in accordance with this disclosure. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805, such computer program code may implement one or more of the methods described herein. Power source 875 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 800.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense, rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

As described above, one aspect of the present technology is the gathering and use of data available from various sources to improve the delivery to users of content sharing suggestions. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content sharing suggestions that are of greater interest and/or greater contextual relevance to the user. Accordingly, use of such personal information data enables users to have more streamlined and meaningful control of the content that they share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content sharing suggestion services, the present technology can be configured to allow users to select to "opt in" or "opt out" of participation in the collection of personal information data during registration for services or anytime thereafter. In another example, users can select not to provide their content and other personal information data for improved content sharing suggestion services. In yet another example, users can select to limit the length of time their personal information data is maintained by a third party, limit the length of time into the past from which content sharing suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information, such as the quality level of the content (e.g., focus, exposure levels, etc.) or the fact that certain content is being requested by a device associated with a contact of the user, other non-personal information available to the user media item management system, or publicly available information.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" means A, B, C, or any combination thereof, such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure. For example, "a user media item" refers to "one user media item" or "a group of user media items."

What is claimed is:

1. An electronic device, comprising:
a memory; and
one or more processors operatively coupled to the memory, wherein the one or more processors are configured to execute instructions causing the one or more processors to:
request a set of candidate media assets for a set of user media items based on a knowledge graph metadata network describing the set of user media items, wherein the set of candidate media assets comprises one or more songs to be used as a soundtrack for the set of user media items;
determine a first energy measure for the set of user media items;
receive metadata for the set of candidate media assets, wherein the metadata includes: (1) an indication of a compatibility value for each of the candidate media assets, the compatibility value estimating whether a candidate media asset is compatible with a user; and (2) a second energy measure for each of the candidate media assets;
rank the set of candidate media assets based, at least in part, on: (a) their respective compatibility values; (b) their respective second energy measures; and (c) the first energy measure of the set of user media items;
determine one or more sets of ranked media assets based on the received metadata and the ranking of the set of candidate media assets; and
output the determined one or more sets of ranked media assets to a display of the electronic device.

2. The device of claim 1, wherein candidate media assets are requested based on at least one of:
media assets previously accessed by the user;
a period of time associated with the set of user media items;
a geographic region associated with the set of user media items; and
a topic associated with the set of user media items determined based on the knowledge graph metadata.

3. The device of claim 2, wherein the candidate media assets are requested based on the period of time and the geographic region, and wherein the received metadata for the set of candidate media assets is based on one or more events associated with the period of time and geographic region.

4. The device of claim 3, wherein an event, of the one or more events, is a concert, wherein the received metadata includes an indication of an artist performing at the concert, and wherein a set of ranked media assets, of the one or more sets of ranked media assets, includes one or more media assets associated with the artist.

5. The device of claim 1, wherein determining the first energy measure of the set of user media items is based on the knowledge graph metadata network.

6. The device of claim 1, wherein ranking the set of candidate media assets further comprises prioritizing candidate media assets of the set of candidate media assets associated with an energy measure lower than the first energy measure of the user media items.

7. The device of claim 1, wherein the one or more processors are further configured to execute instructions causing the one or more processors to filter the candidate media assets based on the received metadata.

8. A method for suggesting media assets comprising:
requesting a set of candidate media assets for a set of user media items based on a knowledge graph metadata network describing the set of user media items, wherein the set of candidate media assets comprises one or more songs to be used as a soundtrack for the set of user media items;
determining a first energy measure for the set of user media items;
receiving metadata for the set of candidate media assets, wherein the metadata includes: (1) an indication of a compatibility value for each of the candidate media assets, the compatibility value estimating whether a candidate media asset is compatible with a user; and (2) a second energy measure for each of the candidate media assets;
ranking the set of candidate media assets based, at least in part, on: (a) their respective compatibility values; (b)

their respective second energy measures; and (c) the first energy measure of the set of user media items;

determining one or more sets of ranked media assets based on the received metadata and the ranking of the set of candidate media assets; and outputting the determined one or more sets of ranked media assets to a display of an electronic device.

9. The method of claim 8, wherein candidate media assets are requested based on at least one of:

media assets previously accessed by the user;

a period of time associated with the set of user media items;

a geographic region associated with the set of user media items; and a topic associated with the set of user media items determined based on the knowledge graph metadata.

10. The method of claim 9, wherein the candidate media assets are requested based on the period of time and the geographic region, and wherein the received metadata for the set of candidate media assets is based on one or more events associated with the period of time and geographic region.

11. The method of claim 10, wherein an event, of the one or more events, is a concert, wherein the received metadata includes an indication of an artist performing at the concert, and wherein a set of ranked media assets, of the one or more sets of ranked media assets, includes one or more media assets associated with the artist.

12. The method of claim 8, wherein determining the first energy measure of the set of user media items is based on the knowledge graph metadata network.

13. The method of claim 8, wherein ranking the set of candidate media assets further comprises prioritizing candidate media assets of the set of candidate media assets associated with an energy measure lower than the first energy measure of the user media items.

14. The method of claim 8, further comprising filtering the candidate media assets based on the received metadata.

15. A non-volatile computer-readable medium that stores instructions that, when executed, cause one or more processor of a device to:

request a set of candidate media assets for a set of user media items based on a knowledge graph metadata network describing the set of user media items, wherein the set of candidate media assets comprises one or more songs to be used as a soundtrack for the set of user media items;

determine a first energy measure for the set of user media items;

receive metadata for the set of candidate media assets, wherein the metadata includes: (1) an indication of a compatibility value for each of the candidate media assets, the compatibility value estimating whether a candidate media asset is compatible with a user; and (2) a second energy measure for each of the candidate media assets;

rank the set of candidate media assets based, at least in part, on: (a) their respective compatibility values; (b) their respective second energy measures; and (c) the first energy measure of the set of user media items;

determine one or more sets of ranked media assets based on the received metadata and the ranking of the set of candidate media assets; and output the determined one or more sets of ranked media assets to a display of an electronic device.

16. The non-volatile computer-readable medium of claim 15, wherein candidate media assets are requested based on at least one of:

media assets previously accessed by the user;

a period of time associated with the set of user media items;

a geographic region associated with the set of user media items; and a topic associated with the set of user media items determined based on the knowledge graph metadata.

* * * * *